United States Patent
Parsons et al.

(10) Patent No.: US 6,704,565 B1
(45) Date of Patent: Mar. 9, 2004

(54) METHOD AND APPARATUS FOR PROVIDING A HOLD TERMINATION MESSAGE SERVICE IN A COMMUNICATIONS NETWORK

(75) Inventors: William G. Parsons, Boise, ID (US); Robert W. Piepho, Boise, ID (US)

(73) Assignee: AT&T Wireless Services, Inc., Redmond, WA (US)

( * ) Notice: Subject to any disclaimer, the term of this patent is extended or adjusted under 35 U.S.C. 154(b) by 929 days.

(21) Appl. No.: 08/997,085

(22) Filed: Dec. 23, 1997

(51) Int. Cl.[7] .......................... H04M 11/00; H04M 3/42; H04M 1/64
(52) U.S. Cl. ................. 455/414.1; 455/412.1; 455/413; 379/68; 379/88.23; 379/215.01; 379/393
(58) Field of Search .......................... 379/88.18, 88.23, 379/265, 266, 215, 68, 87, 393, 70, 74, 77, 162, 163, 204; 455/413, 211.4, 412

(56) References Cited

U.S. PATENT DOCUMENTS

| | | | | |
|---|---|---|---|---|
| 5,327,486 A | * | 7/1994 | Wolff et al. | 379/96 |
| 5,436,967 A | * | 7/1995 | Hanson | 379/266 |
| 5,475,745 A | * | 12/1995 | Boyle | 379/201 |
| 5,544,225 A | * | 8/1996 | Kennedy, III et al. | 455/412 |
| 5,764,746 A | * | 6/1998 | Reichelt | 379/207 |
| 5,930,339 A | * | 7/1999 | Nepustil | 379/88.26 |
| 5,943,395 A | * | 8/1999 | Hansen | 379/52 |

* cited by examiner

Primary Examiner—Duc M. Nguyen
(74) Attorney, Agent, or Firm—Kenyon & Kenyon

(57) ABSTRACT

A method and apparatus for providing a hold termination message service in a communications network. An on-hold telephone call between a hold initiating party and a holding party is monitored at a network node for a hold termination signal, such as a DTMF signal, from the holding party. A hold termination message can be recorded when the hold termination signal is detected. The hold termination message is then delivered from the network node to the hold initiating party.

32 Claims, 3 Drawing Sheets

METHOD AND APPARATUS FOR PROVIDING A HOLD TERMINATION MESSAGE SERVICE IN A COMMUNICATIONS NETWORK

FIELD OF THE INVENTION

The invention relates to communications network services. More particularly the invention relates to a method and apparatus for providing a hold termination message service in a communications network.

BACKGROUND OF THE INVENTION

When talking on the telephone, one party (the "hold initiating" party) will sometimes find it necessary to place another party (the "holding" party) "on-hold." This may occur for example, when the hold initiating party is a call waiting subscriber who decides to answer a second incoming telephone call. If the hold initiating party has several telephone lines, they might place a call on-hold in order to answer a call received on another line. The hold initiating party might place a telephone call on-hold for any number of reasons, such as the need to take care of other business.

While on-hold, there is no way for the holding party to communicate with the hold initiating party. This situation can become frustrating for the holding party, especially as the length of time they are waiting on-hold increases. Additionally, the holding party may find that they also need to answer a second telephone line, or attend to some other business. If the holding party is using a wireless telephone service, such as a cellular phone, the on-hold experience can become not only frustrating, but expensive. Thus, a holding party may wish to terminate the telephone call without waiting for the hold initiating party to return to the call. Similarly, a holding party using a cellular phone may sense they are about to leave the cellular service area, such as by entering a tunnel.

However, because the holding party is not able to communicate with the hold initiating party, there is no satisfactory way for the holding party to terminate the telephone call. A holding party might worry about appearing rude if they decide to simply "hang up" and terminate the telephone call. Moreover, the hold initiating party may assume there has been a technical problem resulting in an inadvertent disconnection when they return to the call and find it has been terminated. A holding party might also want to arrange to have the hold initiating party call back at a different time and/or at a different telephone number.

Finally, any system that allows a holding party to terminate an on-hold telephone call without simply hanging up should be implemented at the communications network level instead of at the customer premises. Some systems, such as those disclosed in U.S. Pat. No. 5,003,587 to Forbes, issued, Mar. 26, 1991, and U.S. Pat. No. 4,834,551 to Katz, issued May 30, 1989, utilize special equipment installed at the customer premises. Because the situation does not occur frequently, it is not practical to expect that consumers will purchase or install a special device to handle being placed on-hold. Moreover, it is not likely that such a device would be carried around and used with cellular phones.

In view of the foregoing, it can be appreciated that a substantial need exists for a method and apparatus to provide a hold termination service in a communications network that allows a holding party to terminate a telephone call without simply hanging up, and solving the other problems discussed above.

SUMMARY OF THE INVENTION

The disadvantages of the art are alleviated to a great extent by a method and apparatus for providing a hold termination message service in a communications network. An on-hold telephone call between a hold initiating party and a holding party is monitored at a network node for a hold termination signal, such as a DTMF signal, from the holding party. A hold termination message can be recorded when the hold termination signal is detected. The hold termination message is then delivered from the network node to the hold initiating party.

With these and other advantages and features of the invention that will become hereinafter apparent, the nature of the invention may be more clearly understood by reference to the following detailed description of the invention, the appended claims and to the several drawings attached herein.

DETAILED DESCRIPTION

Figure 1:
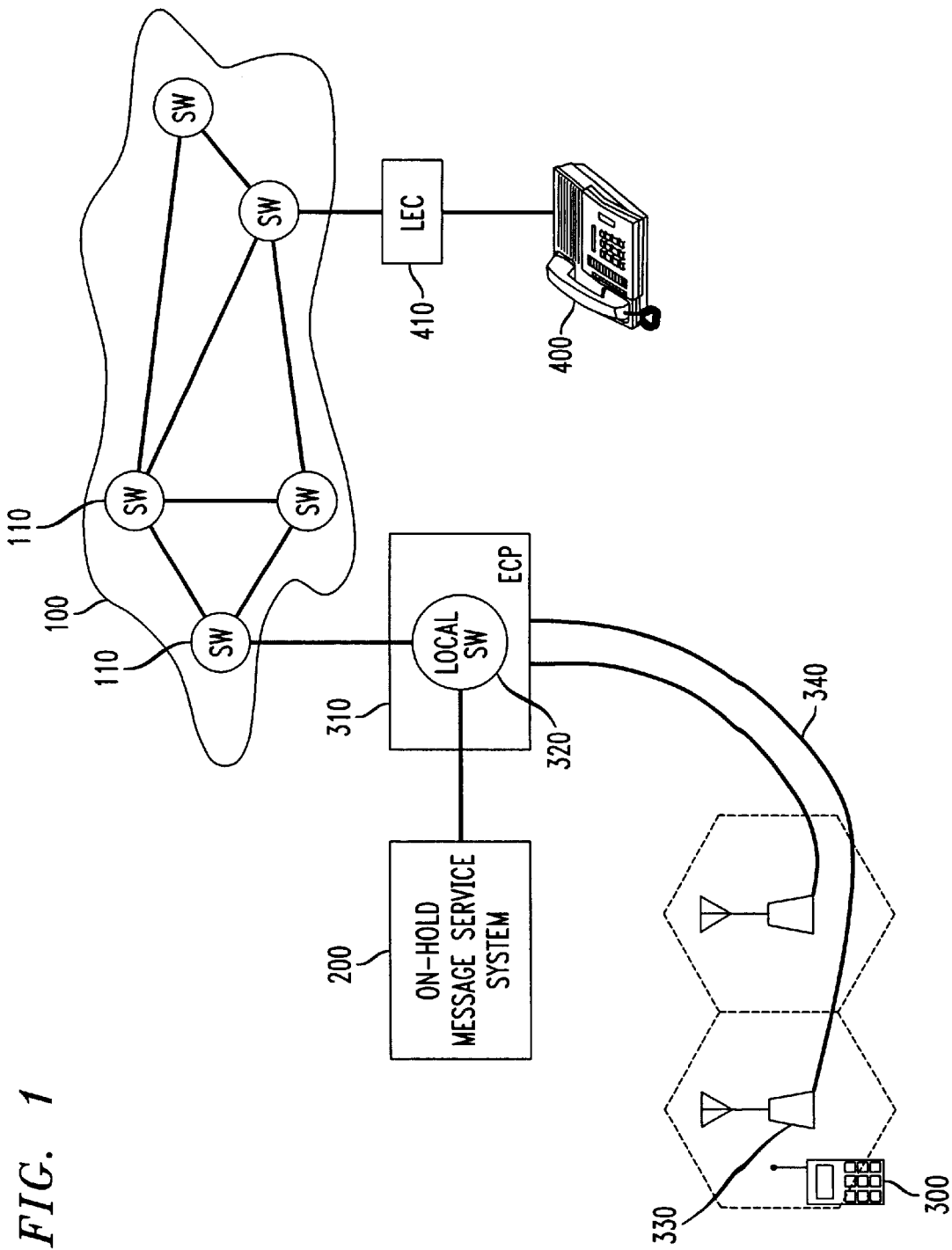
FIG. 1 is a block diagram including elements of a communications network suitable for practicing an embodiment of the present invention.

The present invention is directed to a method and apparatus for providing a hold termination message service in a communications network. Referring now in detail to the drawings wherein like parts are designated by like reference numerals throughout, there is illustrated in FIG. 1 a block diagram including elements of the Public Switched Telephone Network (PSTN), a communications network suitable for practicing an embodiment of the present invention. FIG. 1 illustrates the signal path of a telephone call between a wireless telephone 300 and a second telephone 400. A signal from the wireless telephone 300 is sent from a cellular station 330 to an Executive Cellular Processor (ECP), such as the Autoplex System 1000 ECP available from Lucent Technologies, through a trunk group 340. The ECP 310 includes a local switch (SW) 320 that routes the call to a network 100 of communications switches 110. The call exits the network 100 and reaches the second telephone 400 through a Local Exchange Carrier (LEC) 410.

In the embodiment of the invention shown in FIG. 1, an on-hold message service system 200 is coupled to the local switch 320 in the ECP 310. It should be noted, however, that the on-hold message service system could be associated with any node in the communications network between the wireless telephone 300 and the second telephone 400, such as, for example, at any communications switch 110 or a Mobile Telephone Switching Office (MTSO) or a Mobile Switching Center (MSC), not shown in FIG. 1.

The on-hold message service system 200 provides a holding party, such as a party using the wireless telephone 300, with a way to terminate an on-hold call while leaving a message for the hold initiating party, such as the party using the second telephone 400. The on-hold message service could be offered, for example, as a feature by the communications network provider. Communications network providers typically offer an array of communications service features which are provided to users who subscribe to that feature. If the user of the wireless telephone 300 subscribes to the on-hold message service feature, the on-hold message service system 200 will monitor the call between the wireless telephone 300 and the second telephone 400. When the user of the wireless telephone 300 is put on hold by the user of the second phone 400, they can send a signal to the network indicating they wish to leave a message and terminate the on-hold telephone call.

The holding party could use, for example, flash-hooks or Dual-Tone Multi-Frequency (DTMF) signals to tell the on-hold message service system 200 that they wish to terminate the on-hold telephone call. Alternately, Integrated Services Digital Network (ISDN) telephone sets could access similar functionality via pre-programmed feature buttons, perhaps followed by the entry of DTMF digits. When the on-hold message service system 200 receives such a signal, it can record a hold termination message from the holding party. The holding party might, for example, leave a message saying "I could not wait any longer, please call me back at 3:00 pm" by speaking into the telephone. Instead of recording a message, the holding party may have one or more pre-recorded messages that could be selected using, for example, DTMF signals.

After the hold termination message is recorded, the holding party can simply hang up. When the hold initiating party returns to the telephone call, the on-hold message service system 200 delivers the recorded message to the hold initiating party to the second telephone 400.

Figure 2:
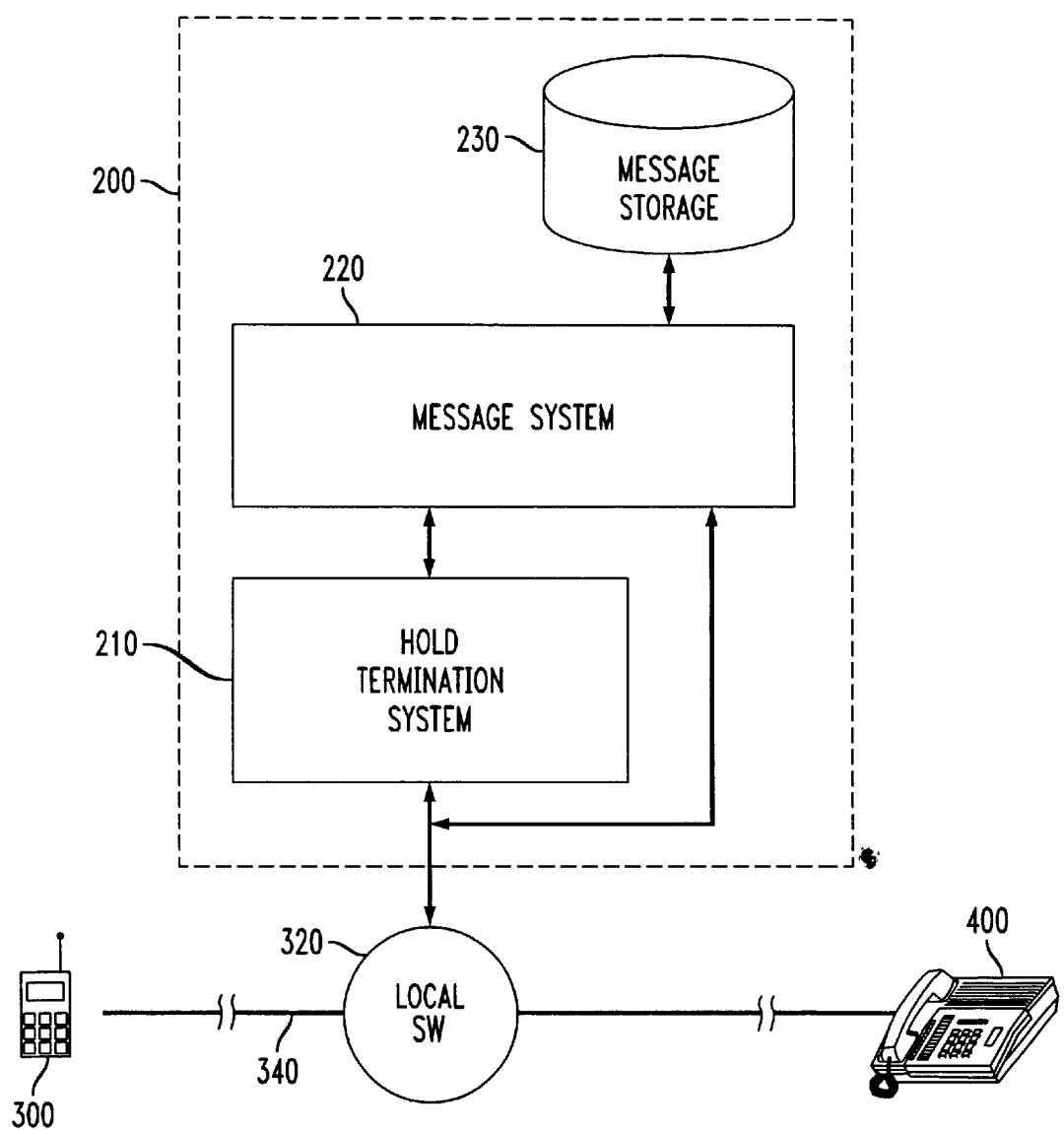
FIG. 2 is a block diagram illustrating the on-hold message service system of FIG. 1 in greater detail according to an embodiment of the present invention.

FIG. 2 is a block diagram illustrating the on-hold message service system 200 of FIG. 1 in greater detail according to an embodiment of the present invention. Again the user of a wireless telephone 300 communicates with the user of a second telephone 400 through a trunk group 340 and a local switch 320. The on-hold message service system 200 is coupled with the local switch through a hold termination system 210. The hold termination system 210 monitors the telephone call to detect a hold termination DTME signal when a subscriber has been placed on-hold. Although an embodiment of the present invention describes a hold termination message service to a "subscriber," it will be appreciated that the service can also be implemented in a way that does not require a subscription, if desired.

If a hold termination signal is detected, a message system 220 can record a message from the holding party and store the message in a message storage unit 230. This might be done by transferring the on-hold call from the current trunk group 340 to an alternate trunk group (not shown in FIG. 2). Such an arrangement would allow the recording and delivery of the message to be performed using a trunk group that is generally used for such purposes. When the hold initiating party returns to the call, as detected by the hold termination system 210, the message system 220 will deliver the message stored in the message storage unit 230 to the second telephone 400.

Figure 3:
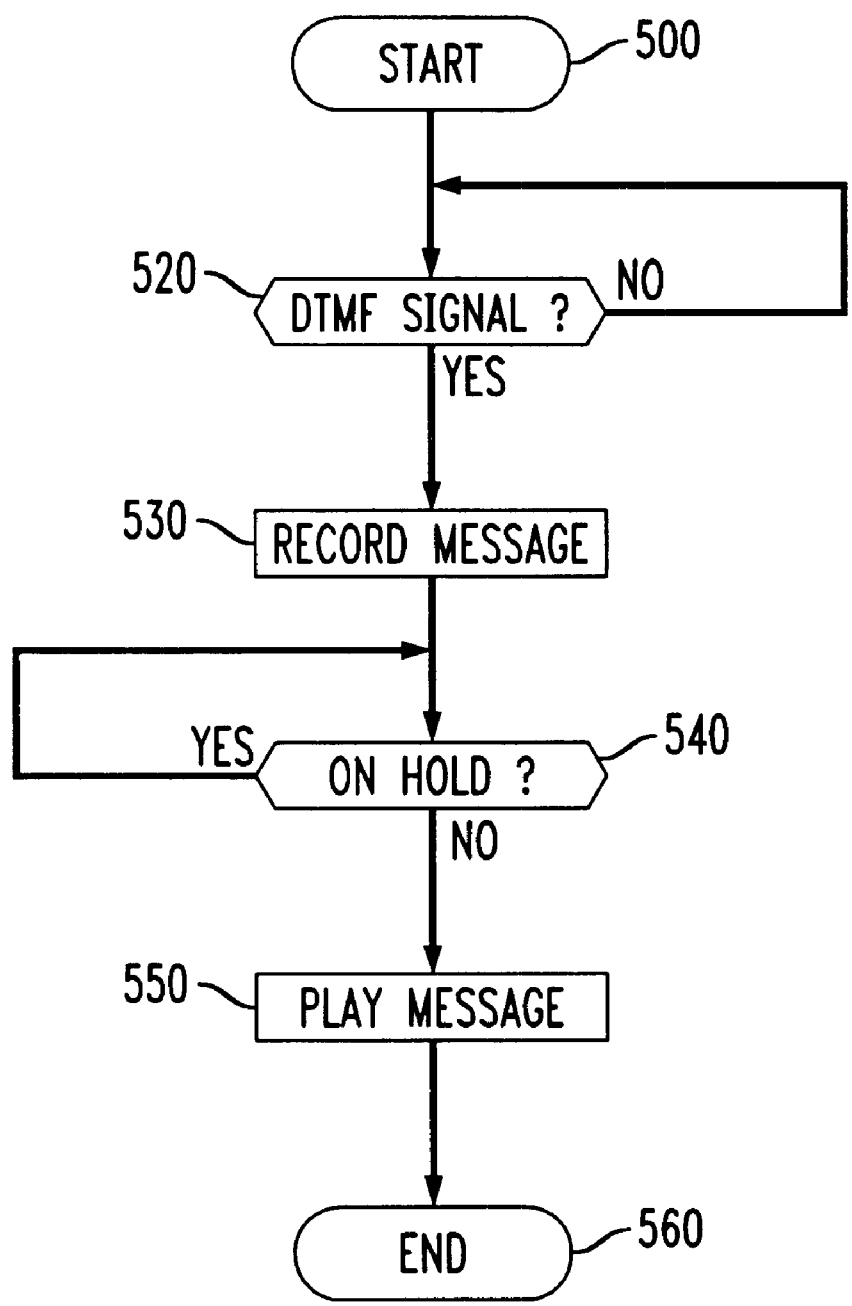
FIG. 3 is a block flow diagram of a process than can be used to provide a hold termination message service according to an embodiment of the present invention.

FIG. 3 is a block flow diagram of a process than can be used to provide a hold termination message service to a subscriber according to an embodiment of the present invention. After beginning at step 500, the process monitors the line to determine if a hold termination signal, such as a DTMF signal, has been received from the holding party at step 520. This could be done, for example, by having the hold termination system monitor the call signal at a communications switch. The process can continuously monitor the line for the hold termination signal, even if the call is not currently on hold, until a hold termination signal is received from the holding party.

When a hold termination signal is received, a hold termination message from the holding party is recorded at step 530. At step 540, the system detects when the hold initiating party returns to the telephone call. This can be done, for example, by having the hold termination system monitor the call signal to detect when the hold initiating party begins to talk. The hold termination message is then delivered to the hold initiating party at step 550 before the process ends at step 560. In another embodiment, the message could be delivered to the hold initiating party using Interim Standard 136 (IS-136) digital Personal Communication is Services (PCS) technology, such as by displaying a text message on the telephone used by the hold initiating party. The message could also be delivered to the hold initiating party using voice mail. In this case, the system could automatically call the hold initiating party, and deliver the voice mail message, when the hold initiating party hangs up.

Although various embodiments are specifically illustrated and described herein, it will be appreciated that modifications and variations of the present invention are covered by the above teachings and within the purview of the appended claims without departing from the spirit and intended scope of the invention. For example, although the on-hold message system was described with respect to a wireless telephone communicating through an ECP, it can be appreciated that other systems, including non-wireless system, can also fall within the scope of the invention.

What is claimed is:

1. A method for processing an on-hold call between a hold initiating party and a holding party, comprising the steps of:
   receiving at a network node a hold termination signal from the holding party;
   receiving at a network node a selection identifier from the holding party; and
   delivering a pre-recorded hold termination message from the network node to the hold initiating party in response to the hold termination signal, the pre-recorded hold termination message being identified by the selection identifier.

2. The method of claim 1, wherein said step of delivering comprises delivering the hold termination message when the hold initiating party returns to the on-hold call.

3. The method of claim 1, wherein said step of delivering comprises delivering the hold termination message to a voice mail system associated with the hold initiating party.

4. The method of claim 1, wherein said step of delivering comprises delivering the hold termination message as a text message to the hold initiating party.

5. The method of claim 1, further comprising the step of:
   selecting at the network node a pre-recorded hold termination message identified by the selection identifier from the holding party in response to the hold termination signal.

6. The method of claim 5, wherein the hold termination signal is a dual-tone multi-frequency tone.

7. The method of claim 5, wherein the network node is associated with a communications switch.

8. The method of claim 7, wherein the communications switch is associated with an executive cellular processor.

9. The method of claim 5, further comprising the step of:
   transferring the on-hold call from a first trunk group to a second trunk group in response to the hold termination signal, wherein the second trunk group is used to perform said steps of selecting and delivering.

10. The method of claim 1, wherein the on-hold call is a wireless call.

11. An apparatus for processing an on-hold call between a hold initiating party and a holding party, comprising:
   means for receiving at a network node a hold termination signal from the holding party
   means for selecting at the network node a pre-recorded hold termination message from the holding party in response to the hold termination signal; and
   means for delivering the hold termination message from the network node to the hold initiating party.

12. The method of claim 11, wherein said means for delivering delivers the hold termination message when the hold initiating party returns to the on-hold call.

13. The method of claim 11, wherein said means for delivering delivers the hold termination message to a voice mail system associated with the hold initiating party.

14. The method of claim 11, wherein said means for delivering delivers the hold termination message as a text message to the hold initiating party.

15. The apparatus of claim 11, wherein the hold termination signal is a dual-tone multi-frequency tone.

16. The apparatus of claim 11, wherein the network node is associated with a communications switch.

17. The apparatus of claim 16, wherein the communications switch is associated with an executive cellular processor.

18. The apparatus of claim 11, wherein the on-hold call is a wireless call.

19. An apparatus for processing an on-hold call between a hold initiating party and a holding party, comprising:
   a hold termination system configured to detect a hold termination signal from the holding party;
   a message system coupled to said hold termination system and configured to select a pre-recorded hold termination message from the holding party when said hold termination system detects the hold termination signal, said message system being further configured to deliver the hold termination message to the hold initiating party; and
   a message storage unit coupled to said message system and configured to store the pre-recorded hold termination message.

20. The apparatus of claim 19, wherein said message system is configured to deliver the hold termination message when the hold initiating party returns to the on-hold call.

21. The apparatus of claim 19, wherein said message system is configured to deliver the hold termination message to a voice mail system associated with the hold initiating party.

22. The apparatus of claim 19, wherein said message system is configured to deliver the hold termination message as a text message to the hold initiating party.

23. The apparatus of claim 19, wherein the hold termination signal is a dual-tone multi-frequency tone.

24. The apparatus of claim 19, wherein the network node is associated with a communications switch.

25. The apparatus of claim 24, wherein the communications switch is associated with an executive cellular processor.

26. The apparatus of claim 19, wherein the on-hold call is a wireless call.

27. A method for processing an on-hold call between a hold initiating party and a holding party, comprising the steps of:
   receiving at a network node a hold termination signal from the holding party;
   receiving at the network node a selection identifier from the holding party; and
   delivering one of a plurality of pre-recorded hold termination messages from the network node to the hold initiating party in response to the hold termination signal, based upon the selection identifier.

28. A method for processing an on-hold call between a hold initiating party and a holding party, comprising the steps of:
   receiving from the holding party a hold termination signal;
   releasing a first portion of the on-hold call associated with the holding party; and
   in response to a state of the hold termination signal, presenting a pre-recorded message to the hold initiating party via a second portion of the on-hold call.

29. The method of claim 28, wherein the hold termination signal identifies one of a plurality of pre-recorded messages.

30. The method of claim 28, wherein the presenting occurs after the hold initiating party returns to the on-hold call.

31. The method of claim 28, wherein the receiving occurs at a network node.

32. The method of claim 28, further comprising:
   in response to a second predetermined state of the hold termination signal, recording a message from the holding party;
   releasing the first portion; and
   presenting the recorded message to the hold initiating party via a second portion of the on-hold call associated with the hold initiating party.

* * * * *